United States Patent
Hwang et al.

(10) Patent No.: US 7,539,264 B2
(45) Date of Patent: May 26, 2009

(54) APPARATUS AND METHOD FOR TRANSMITTING/RECEIVING A PILOT SEQUENCE IN A MOBILE COMMUNICATION SYSTEM USING SPACE-TIME TRELLIS CODE

(75) Inventors: Chan-Soo Hwang, Yongin-shi (KR); Yung-Soo Kim, Songnam-shi (KR); Seung-Hoon Nam, Seoul (KR); Jae-Hak Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 13 days.

(21) Appl. No.: 11/809,317

(22) Filed: May 31, 2007

(65) Prior Publication Data

US 2007/0237262 A1 Oct. 11, 2007

Related U.S. Application Data

(62) Division of application No. 10/695,579, filed on Oct. 28, 2003.

(51) Int. Cl.
*H04B 7/02* (2006.01)
*H04B 7/216* (2006.01)

(52) U.S. Cl. ........................ 375/267; 370/342

(58) Field of Classification Search ............... 375/267, 375/144, 347, 299; 370/342, 335, 208, 441, 370/334; 450/101
See application file for complete search history.

(56) References Cited

U.S. PATENT DOCUMENTS

| | | | |
|---|---|---|---|
| 6,445,746 B1 * | 9/2002 | Kim et al. | 375/280 |
| 6,987,797 B2 * | 1/2006 | Fernandez-Corbaton et al. | 375/148 |
| 2003/0002518 A1 | 1/2003 | Shibutani | |
| 2004/0146025 A1 | 7/2004 | Hwang et al. | |
| 2004/0156328 A1 | 8/2004 | Walton et al. | |

FOREIGN PATENT DOCUMENTS

| | | |
|---|---|---|
| EP | 1 185 001 | 3/2002 |
| EP | 1 229 669 | 8/2002 |
| WO | WO 01/03347 | 1/2001 |
| WO | WO 01/24410 | 4/2001 |
| WO | WO 02/43314 | 5/2002 |

(Continued)

OTHER PUBLICATIONS

T.H. Liew et al., Space-Time Codes and Concatenated Channel Codes for Wireless Communications, Proceedings of the IEEE, vol. 90, No. 2, Feb. 2002, pp. 187-219.

(Continued)

*Primary Examiner*—Khai Tran
(74) *Attorney, Agent, or Firm*—The Farrell Law Firm, P.C.

(57) ABSTRACT

A mobile communication system includes M transmission antennas, P encoders for receiving P information bit streams and encoding the received information bit streams with a space-time trellis code (STTC), and M modulators for modulating information bit streams output from the P encoders in a predetermined modulation scheme and outputting modulation symbol streams. A sequence used for channel estimation is generated, and the sequence is transmitted in substitute for at least one modulation symbol in a predetermined position through the M transmission antennas, for each of the modulation symbol streams output from the M modulators.

8 Claims, 8 Drawing Sheets

FOREIGN PATENT DOCUMENTS

WO      WO 02/103926      12/2002

OTHER PUBLICATIONS

European Search Report dated Mar. 9, 2004 issued in a counterpart application, namely, Appln. No. 03078911.9.

Yue et al., "Performance of a Space-Time Block Coded OFDM System", 2002 IEEE, pp. 1862-1866.

Valenti et al., "A Bandwith Efficient Pilot Symbol Technique for Coherent Detection of Turbo Codes Over Fading Channels"., 1999 IEEE, pp. 81-85.

Vahid Tarokh et al., "Space-Time Codes of High Data Rate Wireless Communication: Performance Criterion and Code Construction", IEEE Transactions on Information Theory, vol. 44, No. 2, Mar. 1998, pp. 744-765.

Ayman F. Naguib et al., "A Space-Time Coding Modem for High-Data-Rate Wireless Communications", IEEE Journal on Selected Areas in Communications, vol. 16, No. 8, Oct. 1998, pp. 1459-1478.

\* cited by examiner

APPARATUS AND METHOD FOR TRANSMITTING/RECEIVING A PILOT SEQUENCE IN A MOBILE COMMUNICATION SYSTEM USING SPACE-TIME TRELLIS CODE

PRIORITY

This application is a divisional of U.S. application Ser. No. 10/695,579, filed on Oct. 28, 2003, which claims priority under 35 U.S.C. § 119 to an application filed in the Korean Intellectual Property Office on Jan. 23, 2003 and assigned Serial No. 2003-4582, the contents of each of which are incorporated herein by reference.

BACKGROUND OF THE INVENTION

1. Field of the Invention

The present invention relates generally to a mobile communication system, and in particular, to an apparatus and method for transmitting/receiving a pilot sequence in a mobile communication system using a space-time trellis code (hereinafter referred to as "STTC").

2. Description of the Related Art

With the rapid development of mobile communication systems, the amount of data serviced by the mobile communication system has also increased. Recently, a $3^{rd}$ generation mobile communication system for transmitting high-speed data has been developed. For the $3^{rd}$ generation mobile communication system, Europe adopts an asynchronous wide-band-code division multiple access (hereinafter referred to as "W-CDMA") system as its radio access standard, while North America adopts a synchronous code division multiple access-2000 (hereinafter referred to as "CDMA-2000") system as its radio access standard. Generally, in these mobile communication systems, a plurality of mobile stations (MSs) communicate with each other via a common base station (BS). However, during high-speed data transmission in the mobile communication system, a phase of a received signal may be distorted due to a fading phenomenon occurring on a radio channel. The fading reduces amplitude of a received signal by several dB to several tens of dB. If a phase of a received signal distorted due to the fading phenomenon is not compensated for during data demodulation, the phase distortion becomes a cause of information error of transmission data transmitted by a transmission side, causing a reduction in the quality of a communication service. Therefore, in order to transmit high-speed data without a decrease in the service quality, mobile communication systems must overcome fading, and use several diversity techniques in order to do so.

Generally, a CDMA system adopts a rake receiver that performs diversity reception by using delay spread of a channel. While the rake receiver applies reception diversity for receiving a multipath signal, a rake receiver applying the diversity technique using the delay spread is disadvantageous in that it does not operate when the delay spread is less than a preset value. In addition, a time diversity technique using interleaving and coding is used in a Doppler spread channel. However, the time diversity technique is disadvantageous in that it can hardly be used in a low-speed Doppler spread channel.

Therefore, in order to cope with fading, a space diversity technique is used in a channel with low delay spread, such as an indoor channel, and a channel with low-speed Doppler spread, such as a pedestrian channel. The space diversity technique uses two or more transmission/reception antennas. In this technique, when a signal transmitted via one transmission antenna decreases in its signal power due to fading, a signal transmitted via the other transmission antenna is received. The space diversity can be classified into a reception antenna diversity technique using a reception antenna and a transmission diversity technique using a transmission antenna. However, because the reception antenna diversity technique is applied to a mobile station, it is difficult to install a plurality of antennas in the mobile station in view of the mobile station's size and its installation cost. Therefore, it is recommended that the transmission diversity technique should be used in which a plurality of transmission antennas are installed in a base station.

Particularly, in a $4^{th}$ generation mobile communication system, a data rate of about 10 Mbps to 150 Mbps is expected, and an error rate requires a bit error rate (hereinafter referred to as "BER") of $10^{-3}$ for voice, BER of $10^{-6}$ for data, and BER of $10^{-9}$ for image. The STTC is a combination of a multi-antenna technique and a channel coding technique, and is a technique bringing a drastic improvement of a data rate and reliability in a radio MIMO (Multi Input Multi Output) channel. The STTC obtains the receiver's space-time diversity gain by extending a space-time dimension of a transmitter's transmission signal. In addition, the STTC can obtain a coding gain without a supplemental bandwidth, contributing to an improvement in channel capacity.

Therefore, in the transmission diversity technique, the STTC is used. When the STTC is used, a coding gain having an effect of increasing transmission power is obtained together with a diversity gain which is equivalent to a reduction in a channel gain occurring due to a fading channel when the multiple transmission antennas are used. A method for transmitting a signal using the STTC is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998.

FIG. 1 is a block diagram schematically illustrating a general structure of a transmitter using STTC. Referring to FIG. 1, when P information data bits $d_1, d_2, d_3, \ldots, d_P$ are input to the transmitter, the input information data bits $d_1, d_2, d_3, \ldots, d_P$ are provided to a serial-to-parallel (S/P) converter 111. Here, the index P represents the number of information data bits to be transmitted by the transmitter for a unit transmission time, and the unit transmission time can become a symbol unit. The S/P converter 111 parallel-converts the information data bits $d_1, d_2, d_3, \ldots, d_P$ and provides its outputs to first to $P^{th}$ encoders 121-1 to 121-P. That is, the S/P converter 111 provides a parallel-converted information data bit $d_1$ to the first encoder 121-1, and in this manner, provides a parallel-converted information data bit $d_P$ to the $P^{th}$ encoder 121-P. The first to $P^{th}$ encoders 121-1 to 121-P each encode signals received from the S/P converter 111 in a predetermined encoding scheme, and then each provide their outputs to first to $M^{th}$ modulators 131-1 to 131-M. Here, the index M represents the number of transmission antennas included in the transmitter, and the encoding scheme is an STTC encoding scheme. A detailed structure of the first to $P^{th}$ encoders 121-1 to 121-P will be described later with reference to FIG. 2.

The first to $M^{th}$ modulators 131-1 to 131-M each modulate signals received from the first to $P^{th}$ encoders 121-1 to 121-P in a predetermined modulation scheme. The first to $M^{th}$ modulators 131-1 to 131-M are similar to one another in operation except the signals applied thereto. Therefore, only the first modulator 131-1 will be described herein. The first modulator 131-1 adds up signals received from the first to $P^{th}$ encoders 121-1 to 121-P, multiplies the addition result by a gain applied to a transmission antenna to which the first modulator 131-1 is connected, i.e., a first transmission antenna ANT#1, modulates the multiplication result in a predetermined modulation scheme, and provides the modulation result to a first multiplexer (MUX#1) 141-1. Here, the modulation scheme includes BPSK (Binary Phase Shift Keying), QPSK (Quadrature Phase Shift Keying), QAM (Quadrature Amplitude Modulation), PAM (Pulse Amplitude Modulation), and PSK (Phase Shift Keying). It will be assumed in FIG. 1 that since the number of encoders is P, $2^P$-ary QAM is used as a modulation scheme.

The first to $M^{th}$ modulators 131-1 to 131-M provide their modulation symbols $S_1$ to $S_M$ to first to $M^{th}$ multiplexers 141-1 to 141-M, respectively. The first multiplexer 141-1 receives a modulation symbol $S_1$ output from the first modulator 131-1, multiplexes a training sequence or a pilot sequence generated by a training sequence generator 151, and transmits its output via the first transmission antenna ANT#1. The training sequence generator 151 generates a sequence for channel estimation between a transmitter and a receiver, and generates 2 kinds of sequences: a sequence having a relatively long length; and a sequence having a relatively short length. The sequence having a relatively long length is a training sequence transmitted for initial channel estimation between the transmitter and the receiver, while the sequence having a relatively short length is a pilot sequence transmitted for channel estimation between the transmitter and the receiver during communication. During transmission of the training sequence and the pilot sequence, no information data is transmitted. Like the first multiplexer 141-1, other multiplexers, for example, the $M^{th}$ multiplexer 141-M receives a modulation symbol $S_M$ output from the $M^{th}$ modulator 131-M, multiplexes a training sequence or a pilot sequence generated by the training sequence generator 151, and transmits its output via the $M^{th}$ transmission antenna ANT#M.

FIG. 2 is a block diagram illustrating a detailed structure of the first to $P^{th}$ encoders 121-1 to 121-P of FIG. 1. For simplicity, a description will be made of only the first encoder 121-1. The information data bit $d_1$ output from the S/P converter 111 is applied to the first encoder 121-1, and the first encoder 121-1 provides the information data bit $d_1$ to tapped delay lines, i.e., delays (D) 211-1, 211-2, ..., 211-(K−1). Here, the number of the delays, or the tapped delay lines, is smaller by 1 than a constraint length K of the first encoder 121-1. The delays 211-1, 211-2, ..., 211-(K−1) each delay their input signals. That is, the delay 211-1 delays the information data bit $d_1$ and provides its output to the delay 211-2, and the delay 211-2 delays an output signal of the delay 211-1. In addition, input signals provided to the delays 211-1, 211-2, ..., 211-(K−1) are multiplied by predetermined gains, and then provided to modulo adders 221-1, ..., 221-M, respectively. The number of the modulo adders is identical to the number of the transmission antennas. In FIG. 1, since the number of the transmission antennas is M, the number of the modulo adders is also M. Further, gains multiplied by the input signals of the delays 211-1, 211-2, ..., 211-(K−1) are represented by $g_{i,j,t}$, where i denotes an encoder index, j an antenna index and t a memory index. In FIG. 1, since the number of encoders is P and the number of antennas is M, the encoder index i increases from 1 to P, the antenna index increases from 1 to M, and the memory index K increases from 1 to the constraint length K. The modulo adders 221-1, ..., 221-M each modulo-add signals obtained by multiplying the input signals of the corresponding delays 211-1, 211-2, ..., 211-(K−1) by the gains. The STTC encoding scheme is also disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998.

In order to decode the STTC-encoded signal transmitted by the transmitter, a receiver must have information on a channel characteristic that transmission signals transmitted via the plural transmission antennas experience while they are delivered to the receiver. In order to determine a channel characteristic of the transmission signals, the receiver performs a channel estimation process. Generally, in order to enable the receiver to perform channel estimation, a transmitter transmits a training sequence or a pilot sequence. Then, the receiver performs channel estimation by using the training sequence or the pilot sequence transmitted from the transmitter, and decodes a signal received according to the channel estimation result into a transmission signal transmitted by the transmitter.

In this manner, the transmitter transmits a training sequence or a pilot sequence for channel estimation, and during transmission of the training sequence or the pilot sequence, no information data is transmitted. The training sequence is periodically transmitted for synchronization between a transmitter and a receiver. Generally, when a channel environment does not undergo an abrupt change, channel estimation can be performed with only the training sequence. However, if a channel environment change speed is increased to the extent that a channel characteristic is changed within a relatively short time, for example, within one frame, the transmitter transmits a pilot sequence within a frame for the channel estimation. The receiver then accurately estimates the rapidly changing channel characteristic by detecting the pilot sequence, and correctly decode a received signal depending on the channel estimation result.

FIG. 3 schematically illustrates a frame format transmitted by the transmitter illustrated in FIG. 1. FIG. 3 will be described on the assumption that the number of transmission antennas included in the transmitter of FIG. 1 is 2. Referring to FIG. 3, each frame format transmitted through a first antenna ANT#1 and a second antenna ANT#2 is comprised of a training sequence transmission period (Training_Sequence) 311, information data transmission periods (Data) 313, 317 and 321, and pilot sequence transmission periods (Pilot) 315, 319, and 333. The training sequence transmission period 311 is a time period in which a training sequence for initial channel estimation between the transmitter and a receiver is transmitted. The information data transmission periods 313, 317, and 321 are time periods in which actual information data is transmitted, and the pilot sequence transmission periods 315, 319, and 333 are time periods in which a pilot sequence for channel estimation during transmission/reception of actual information data is transmitted. Herein, the time period in which the training sequence is transmitted is defined as "$T_T$," the time period in which the information data is transmitted is defined as "$T_D$," and the time period in which the pilot sequence is transmitted is defined as "$T_P$." Therefore, the first to $M^{th}$ multiplexers 141-1 to 141-M of the transmitter (1) transmit a predetermined training sequence, i.e., a training sequence output from the training sequence generator 151, in the time period $T_T$, (2) transmit information data, i.e., modulation symbols $S_1$ to $S_M$ output from the first to $M^{th}$ modulators 131-1 to 131-M, in the time period $T_D$, and (3) transmit a pilot sequence, i.e., a pilot sequence output from the training sequence generator 151, in the time period $T_P$.

FIG. 4 is a block diagram schematically illustrating a structure of an STTC transmitter having two encoders and 3 transmission antennas. Referring to FIG. 4, when 2 information data bits $d_1$ and $d_2$ are input to the transmitter, the input information data bits $d_1$ and $d_2$ are applied to an S/P converter 411. The S/P converter 411 parallel-converts the information data bits $d_1$ and $d_2$, and outputs the information data bit $d_1$ to a first encoders 421-1 and the information data bit $d_2$ to a second encoder 421-2. If it is assumed that the first encoder 421-1 has a constraint length K of 4 (constraint length K=4), an internal structure, illustrated in FIG. 2, of the first encoder 421-1 is comprised of 3 delays $(1+2D+D^3)$ and 3 modulo adders, wherein the number of delays and modulo adders is equal to a value smaller by 1 than the constant length K=4. Therefore, in the first encoder 421-1, the undelayed information data bit $d_1$ applied to a first delay, a bit determined by multiplying a bit delayed once by the first delay by 2, and a bit delayed three times by a third delay are provided to a first modulo adder connected to a first modulator 431 of a first transmission antenna ANT#1. In this manner, outputs of the 3 modulo adders of the first encoder 421-1 are provided to the first modulator 431-1, a second modulator 431-2, and a third modulator 431-3, respectively. Similarly, the second encoder 421-2 encodes the information data bit $d_2$ output from the S/P converter 411 in the same encoding method as that used by the first encoder 421-1, and then, provides its outputs to the first modulator 431-1, the second modulator 431-2, and the third modulator 431-3.

The first modulator 431-1 modulates the signals output from the first encoder 421-1 and the second encoder 421-2 in a predetermined modulation scheme, and provides its output to a first multiplexer 441-1. It is assumed herein that a modulation scheme applied to the transmitter is QPSK. Therefore, if an output signal of the first encoder 421-1 is $b_1$ and an output signal of the second encoder 421-2 is $b_2$, the first modulator 431-1 modulates the output signals in the QPSK modulation scheme, and outputs $b_1+b_2*j$, where $j=\sqrt{-1}$. Like the first modulator 431-1, the second modulator 431-2 and the third modulator 431-3 modulate output signals of the first encoder 421-1 and the second encoder 421-2 in the QPSK modulation scheme, and then, provide their outputs to a second multiplexer 441-2 and a third multiplexer 441-3, respectively. The first to third multiplexers 441-1 to 441-3 multiplex output signals of the first to third modulators 431-1 to 431-3 with an output signal of a training sequence generator 451, and provide their outputs to first to third antennas ANT#1 to ANT#3, respectively. It will be assumed herein that a time $T_T$ in which the training sequence is transmitted is 10 ($T_T$=10), a time $T_D$ in which the data information is transmitted is 10 ($T_D$=10), and a time $T_P$ in which the pilot sequence is transmitted is 2 ($T_P$=2). In this case, the first to third multiplexers 441-1 to 441-3 each transmit a training sequence output from the training sequence generator 451 for the first 10 symbols, transmit information data signals, i.e., modulation symbols $S_1$ to $S_3$ output from the first to third modulators 431-1 to 431-3, for the next 10 symbols, and transmit a pilot sequence output from the training sequence generator 451 for the next 2 symbols.

FIG. 5 is a block diagram schematically illustrating a receiver structure corresponding to the transmitter structure illustrated in FIG. 1. Referring to FIG. 5, a signal transmitted to the air by a transmitter is received through reception antennas of the receiver. It is assumed in FIG. 5 that there are provided N reception antennas. The N reception antennas each process signals received from the air. Specifically, a signal received through a first reception antenna ANT#1 is provided to a first demultiplexer (DEMUX) 511-1, and in the same manner, a signal received through an $N^{th}$ reception antenna ANT#N is provided to an $N^{th}$ demultiplexer 511-N. The first to $N^{th}$ demultiplexers 511-1 to 511-N demultiplex signals received from the first to $N^{th}$ reception antennas ANT#1 to ANT#N, and provide their outputs to a channel estimator 513 or a metric calculator 515. Here, the first to $N^{th}$ demultiplexers 511-1 to 511-N demultiplex their input signals into information data, a training sequence, or a pilot sequence. In other words, the first to $N^{th}$ demultiplexers 511-1 to 511-N demultiplex a received signal to be matched with a corresponding transmission period of the transmitter, as was described in conjunction with FIG. 3. That is, if the received signal corresponds to a period in which a training sequence is received, the first to $N^{th}$ demultiplexers 511-1 to 511-N provide the received training sequence to the channel estimator 513. If the received signal corresponds to a period in which information data is received, the first to $N^{th}$ demultiplexers 511-1 to 511-N provide the received information data to the metric calculator 515. If the received signal corresponds to a period in which a pilot sequence is received, the first to $N^{th}$ demultiplexers 511-1 to 511-N provide the received pilot sequence to the channel estimator 513.

The channel estimator 513 channel-estimates signals output from the first to $N^{th}$ demultiplexers 511-1 to 511-N by using a signal output from a training sequence generator 514, and outputs the channel estimation result to a hypothesis part 517. Here, the training sequence generator 514 generates a training sequence or pilot sequence generated in the transmitter, i.e., the same training sequence or pilot sequence as the training sequence or pilot sequence generated by the training sequence generator 151 as was described in conjunction with FIG. 1. Therefore, the channel estimator 513 performs initial channel estimation by comparing output signals of the first to $N^{th}$ demultiplexers 511-1 to 511-N, received for the training sequence reception period, with a signal output from the training sequence generator 514. A method for performing initial channel estimation by using the training sequence is disclosed in A. F. Naguib, V. Tarokh, N. Seshadri, and A. Calderbank, "A Space Time Coding Modem For High Data Rate Wireless Communications," IEEE Journal on selected areas in communications, pp. 1459-1478, Vol, No. 8. October 1998.

A possible sequence generator 519 generates all kinds of sequences which were possibly simultaneously encoded for information data bits transmitted by the transmitter, and provides the generated sequences to first to $P^{th}$ encoders 521-1 to 521-P. Because the transmitter transmits information data by the P information bits, the possible sequence generator 519 generates possible sequences $\tilde{d}_1 \ldots \tilde{d}_P$ comprised of P bits. The P bits of the generated possible sequences are applied to the first to $P^{th}$ encoders 521-1 to 521-P, and the first to $P^{th}$ encoders 521-1 to 521-P encode their input bits in the STTC encoding scheme as was described in conjunction with FIG. 2, and then provide the encoded bits to first to $M^{th}$ modulators 531-1 to 531-M. The first to $M^{th}$ modulators 531-1 to 531-M each modulate the encoded bits output from the first to $P^{th}$ encoders 521-1 to 521-P in a predetermined modulation scheme, and provide their outputs to the hypothesis part 517. The modulation scheme applied in the first to $M^{th}$ modulators 531-1 to 531-M is set to any one of the BPSK, QPSK, QAM, PAM and PSK modulation schemes. Because a modulation scheme applied in the first to $M^{th}$ modulators 141-1 to 141-M of FIG. 1 is $2^P$-ary QAM, the first to $M^{th}$ modulators 531-1 to 531-M also modulate their input signals in the $2^P$-ary QAM modulation scheme.

The hypothesis part 517 receives modulation symbols output from the first to $M^{th}$ modulators 531-1 to 531-M and the channel estimation value output $\tilde{S}_1 \ldots \tilde{S}_M$ from the channel estimator 513, generates a hypothetic channel output at a time when a sequence consisting of the signals output from the first to $M^{th}$ modulators 531-1 to 531-M passed a channel corresponding to the channel estimation result, and provides the generated hypothetic channel output to the metric calculator 515. The metric calculator 515 receives the hypothetic channel output provided from the hypothesis part 517 and the signals output from the first to $N^{th}$ demultiplexers 511-1 to 511-N, and calculates a distance between the hypothetic channel output and the output signals of the first to $N^{th}$ demultiplexers 511-1 to 511-N. The metric calculator 515 uses Euclidean distance when calculating the distance.

In this manner, the metric calculator 515 calculates Euclidean distance for all possible sequences the transmitter can transmit, and then provides the calculated Euclidean distance to a minimum distance selector 523. The minimum distance selector 523 selects a Euclidean distance having the minimum distance from Euclidean distances output from the metric calculator 515, determines information bits corresponding to the selected Euclidean distance as information bits transmitted by the transmitter, and provides the determined information bits to a parallel-to-serial (P/S) converter 525. Although there are several possible algorithms used when the minimum distance selector 523 determines information bits corresponding to the Euclidean distance having the minimum distance, it is assumed herein that a Viterbi algorithm is used. A process of extracting information bits having the minimum distance by using the Viterbi algorithm is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, so a detailed description thereof will not be provided for simplicity.

Because the minimum distance selector 523 determines information bits corresponding to the Euclidean distance having the minimum distance for all sequences generated from the possible sequence generator 519, it finally outputs P information bits of $\hat{d}_1, \hat{d}_1, \ldots, \hat{d}_P$. The P/S converter 525 then serial-converts the P information bits output from the minimum distance selector 523, and outputs reception information data sequences $\hat{d}_{1,d1}, \ldots, \hat{d}_P$.

As described above in conjunction with FIGS. 1 to 5, a transmitter using STTC transmits a training sequence and a pilot sequence for initial channel estimation and in-communication channel estimation, and during transmission of the training sequence and the pilot sequence, no information data is transmitted through all transmission antennas of the transmitter except the training sequence and the pilot sequence. Because no information data is transmitted during transmission of the training sequence and the pilot sequence, a data rate of the transmitter is decreased. For example, when the transmitter has 2 transmission antennas, a training sequence and a pilot sequence are transmitted through both of the 2 transmission antennas in a period where the training sequence and the pilot sequence are transmitted. Therefore, in the period where the training sequence and the pilot sequence are transmitted, it is impossible to transmit information data. Due to the impossibility of transmitting information data, a data rate of the transmitter is decreased, and if there are a total of L pilot sequence transmission periods and information data transmission periods for one frame, the entire overhead becomes $(LT_P+T_T)/(LT_P+LT_D+T_T)$. For example, assuming a period $T_D$ in which the information data is transmitted has a length 3 times longer than a period $T_P$ in which the pilot sequence is transmitted, if the L is set to a relatively large value, an overhead of the transmitter is 25% of the entire overhead. That is, a decrease in a data rate of the transmitter results in a reduction in the system performance.

SUMMARY OF THE INVENTION

It is, therefore, an object of the present invention to provide an apparatus and method for transmitting/receiving a pilot sequence in a mobile communication system using STTC.

It is another object of the present invention to provide a pilot sequence transmission/reception apparatus and method for maximizing a data rate in a mobile communication system using STTC.

To achieve the above and other objects, the present invention provides an apparatus for transmitting a sequence used for channel estimation in a mobile communication system including M transmission antennas, P encoders for receiving P information bit streams and encoding the received information bit streams with a space-time trellis code (STTC), and M modulators for modulating information bit streams output from the P encoders in a predetermined modulation scheme and outputting modulation symbol streams. The apparatus comprises: a sequence generator for generating a sequence used for the channel estimation; M puncturers for puncturing at least one modulation symbol in a predetermined position for each of the modulation symbol streams output from the M modulators; and M multiplexers individually connected to the M transmission antennas, for multiplexing signals output from the M puncturers and the sequence inserted in the punctured modulation symbol.

To achieve the above and other objects, the present invention also provides an apparatus for receiving a sequence for channel estimation in a mobile communication system which receives through N reception antennas modulation symbol streams transmitted by a transmitter through M transmission antennas. The apparatus comprises: N demultiplexers individually connected to the N reception antennas, for outputting a reception symbol in at least one predetermined position as a sequence for the channel estimation, for each of reception symbol streams output from the N reception antennas; and a channel estimator for performing channel estimation by using sequences for channel estimation, output from the N demultiplexers.

To achieve the above and other objects, the present invention provides a method for transmitting a sequence used for channel estimation in a mobile communication system including M transmission antennas, P encoders for receiving P information bit streams and encoding the received information bit streams with a space-time trellis code (STTC), and M modulators for modulating information bit streams output form the P encoders in a predetermined modulation scheme and outputting modulation symbol streams. The method comprises the steps of: generating a sequence used for the channel estimation; and transmitting the sequence in substitute for at least one modulation symbol in a predetermined position through the M transmission antennas, for each of the modulation symbol streams output from the M modulators.

To achieve the above and other objects, the present invention also provides a method for receiving a sequence for channel estimation in a mobile communication system which receives through N reception antennas modulation symbol streams transmitted by a transmitter through M transmission antennas. The method comprises the steps of: outputting a reception symbol in at least one predetermined position as a sequence for the channel estimation, for each of reception symbol streams output from the N reception antennas; and performing channel estimation by using sequences for the channel estimation.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
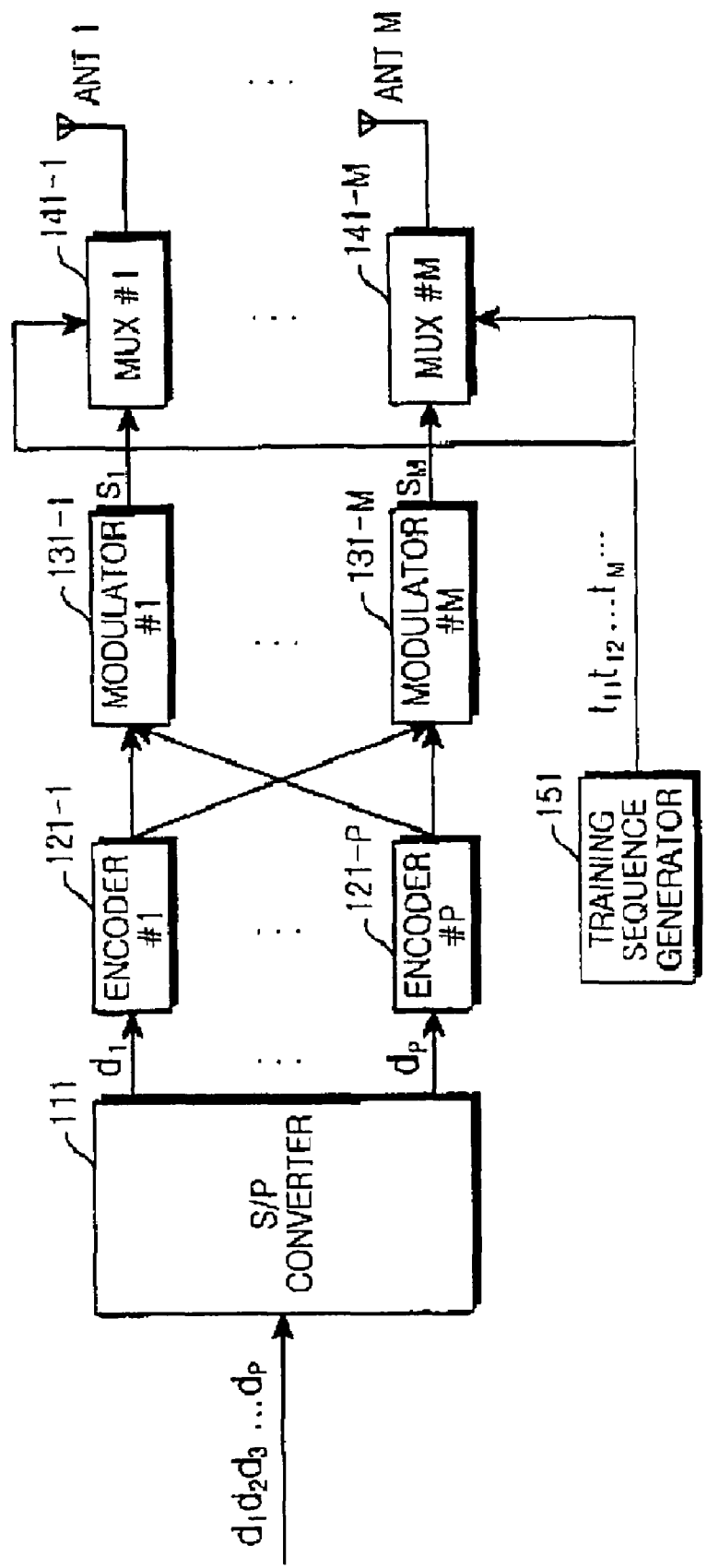
FIG. 1 is a block diagram schematically illustrating a conventional structure of a transmitter using STTC.

Several preferred embodiments of the present invention will be described in detail herein below with reference to the annexed drawings. In drawings, the same or similar elements are denoted by the same reference numerals even though they are depicted in different drawings. In the following description, a detailed description of known functions and configurations incorporated herein has been omitted for conciseness.

Figure 2:
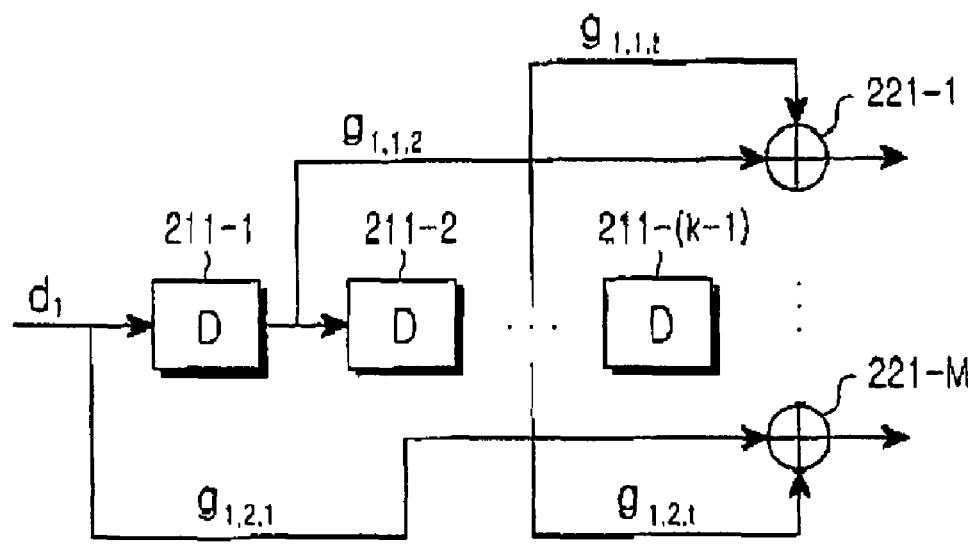
FIG. 2 is a block diagram illustrating a detailed structure of the first to $P^{th}$ encoders 121-1 to 121-P illustrated in FIG. 1.
Figure 6:
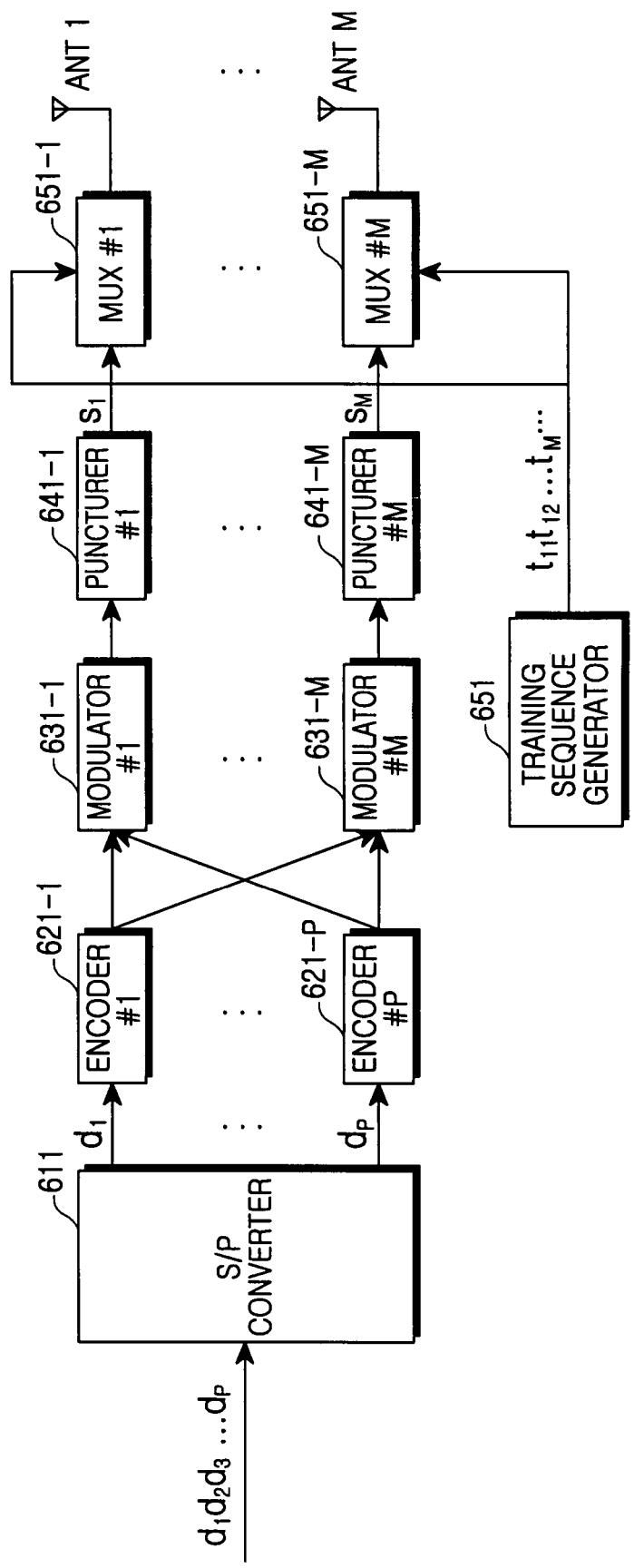
FIG. 6 is a block diagram schematically illustrating a transmitter structure using a space-time trellis code (STTC) according to an embodiment of the present invention.

FIG. 6 is a block diagram schematically illustrating a transmitter structure using a space-time trellis code (STTC) according to an embodiment of the present invention. Referring to FIG. 6, when P information data bits $d_1, d_2, d_3, \ldots, d_P$ are input to the transmitter, the input information data bits $d_1, d_2, d_3, \ldots, d_P$ are provided to a serial-to-parallel (S/P) converter 611. Here, the index P represents the number of information data bits to be transmitted by the transmitter for a unit transmission time, and the unit transmission time can become a symbol unit. The S/P converter 611 parallel-converts the information data bits $d_1, d_2, d_3, \ldots, d_P$ and provides its outputs to first to $P^{th}$ encoders 621-1 to 621-P. That is, the S/P converter 611 provides a parallel-converted information data bit $d_1$ to the first encoder 621-1, and in this manner, provides a parallel-converted information data bit $d_P$ to the $P^{th}$ encoder 621-P. The first encoder 621-1 then encodes the information data bit $d_1$ in a predetermined encoding scheme, and then provides its output to first to $M^{th}$ modulators 631-1 to 631-M. Here, the index M represents the number of transmission antennas included in the transmitter, and the encoding scheme is an STTC encoding scheme. In this manner, the $P^{th}$ encoders 621-P encodes the information data bit $d_P$ in the STTC encoding scheme, and then provides its output to first to $M^{th}$ modulators 631-1 to 631-M. An internal structure of the first to $P^{th}$ encoders 621-1 to 621-P is identical to the structure illustrated in FIG. 2, so a detailed description thereof will be omitted for simplicity.

The first to $M^{th}$ modulators 631-1 to 631-M each modulate signals output from the first to $P^{th}$ encoders 621-1 to 621-P in a predetermined modulation scheme. The first to $M^{th}$ modulators 631-1 to 631-M are similar to one another in operation except the signals applied thereto. Therefore, only the first modulator 631-1 will be described herein. The first modulator 631-1 adds up signals output from the first to $P^{th}$ encoders 621-1 to 621-P, multiplies the addition result by a gain applied to a transmission antenna to which the first modulator 631-1 is connected, i.e., a first transmission antenna ANT#1, modulates the multiplication result in a predetermined modulation scheme, and provides the modulation result to a first puncturer 641-1. Here, the modulation scheme includes BPSK (Binary Phase Shift Keying), QPSK (Quadrature Phase Shift Keying), QAM (Quadrature Amplitude Modulation), PAM (Pulse Amplitude Modulation), and PSK (Phase Shift Keying). It will be assumed in FIG. 6 that because the number of encoders is P, $2^P$-ary QAM is used as a modulation scheme.

The first to $M^{th}$ modulators 631-1 to 631-M provide their modulation symbols $S_1$ to $S_M$ to first to $M^{th}$ puncturers 641-1 to 641-M, respectively. The first to $M^{th}$ puncturers 641-1 to 641-M puncture the modulation symbols $S_1$ to $S_M$ received from the first to $M^{th}$ modulators 631-1 to 631-M according to a predetermined puncturing matrix, and then provide their outputs to first to $M^{th}$ multiplexers 651-1 to 651-M, respectively. In the invention, the first to $M^{th}$ puncturers 641-1 to 641-M periodically puncture the modulation symbols $S_1$ to $S_M$ output from the first to $M^{th}$ modulators 631-1 to 631-M, respectively, according to transmission antennas.

A detailed description will now be made of a procedure in which the first to $M^{th}$ puncturers 641-1 to 641-M puncture the modulation symbols $S_1$ to $S_M$ output from the first to $M^{th}$ modulators 631-1 to 631-M according to the puncturing matrix, respectively.

For example, assuming that the number of transmission antennas included in the transmitter is 2, when 4 symbols are transmitted through the 2 transmission antennas for a unit transmission period, a puncturing matrix of Equation (1) below is applied.

$$P_1 = \begin{bmatrix} 1 & 1 & 1 & 0 \\ 1 & 0 & 1 & 1 \end{bmatrix} \quad \text{Equation (1)}$$

In Equation (1), $P_1$ represents a puncturing matrix. In the puncturing matrix $P_1$, a column represents a transmission period, i.e., a symbol period, and a row represents a transmission antenna. In the puncturing matrix $P_1$, an element "1" indicates that an input symbols is passed without being punctured, while an element "0" indicates that an input symbol is punctured, so that no symbol is transmitted for a corresponding period. That is, in the puncturing matrix $P_1$, for a first column, or a first symbol period, a signal output from a first modulator connected to a first transmission antenna and a signal output from a second modulator connected to a second transmission antenna are passed without being punctured. However, in the puncturing matrix $P_1$, for a second column, or a second symbol period, a signal output from the first modulator connected to the first transmission antenna is passed without being punctured, while a signal output from the second modulator connected to the second transmission antenna is punctured. Therefore, a code rate for the case where the puncturing matrix $P_1$ is applied is 4/3 times higher than a code rate for the case where the puncturing matrix $P_1$ is not applied.

As another example, assuming that the number of transmission antennas included in the transmitter is 2, when 6 symbols are transmitted through the 2 transmission antennas for a unit transmission period, a puncturing matrix of Equation (2) below can be applied.

$$P_2 = \begin{bmatrix} 1 & 1 & 1 & 1 & 1 & 0 & 1 & 1 & 1 & 1 & 0 \\ 1 & 1 & 0 & 1 & 1 & 1 & 1 & 1 & 0 & 1 & 1 \end{bmatrix} \quad \text{Equation (2)}$$

In Equation (2), $P_2$ represents a puncturing matrix. In the puncturing matrix $P_2$, a column represents a transmission period, i.e., a symbol period, and a row represents a transmission antenna. In the puncturing matrix $P_2$, an element "1" indicates that an input symbols is passed without being punctured, while an element "0" indicates that an input symbol is punctured, so that no symbol is transmitted for a corresponding period.

In this manner, the first to $M^{th}$ puncturers 641-1 to 641-M pass their input symbols without puncturing or puncture their input symbols according to a puncturing matrix, and provide their outputs to the first to $M^{th}$ multiplexers 651-1 to 651-M. The first to $M^{th}$ multiplexers 651-1 to 651-M multiplex signals output from the first to $M^{th}$ puncturers 641-1 to 641-M, and then provide their outputs to first to $M^{th}$ transmission antennas ANT#1 to ANT#M. An operation of the first to $M^{th}$ multiplexers 651-1 to 651-M will now be described herein below.

Because the first to $M^{th}$ multiplexers 651-1 to 651-M are similar to each another in operation, for simplicity, only the first multiplexer 651-1 will be described. The first multiplexer 651-1 multiplexes a signal output from the first puncturer 641-1 according to the puncturing matrix. That is, if a corresponding element of the puncturing matrix is "1," the first multiplexer 651-1 transmits the intact signal output from the first puncturer 641 through the first transmission antenna ANT#1. In contrast, if a corresponding element of the puncturing matrix is "0," because there is no signal output from the first puncturer 641-1, the first puncturer 641-1 multiplexes a signal output from a training sequence generator 661, i.e., a training sequence or a pilot sequence, and then transmits the multiplexed signal through the first transmission antenna ANT#1. In this manner, the $M^{th}$ multiplexer 651-M multiplexes a signal output from the $M^{th}$ puncturer 641-M and a signal output from the training sequence generator 661 according to the puncturing matrix, and then transmits its output through the $M^{th}$ transmission antenna ANT#M. Here, a transmission period where the puncturing matrix is applied is a period in which the pilot sequence is transmitted, and the training sequence is transmitted in the existing manner.

As a result, symbols transmitted through the first to $M^{th}$ transmission antennas ANT#1 to ANT#M periodically include a pilot sequence, and a data rate is increased by preventing only a transmission antenna that transmits the pilot sequence from transmitting information data, instead of preventing all of the first to $M^{th}$ transmission antennas ANT#1 to ANT#M from transmitting information data in order to transmit the pilot sequence. In FIG. 6, the first to $M^{th}$ puncturers 641-1 to 641-M puncture corresponding symbols according to the puncturing matrix. Alternatively, the first to $M^{th}$ multiplexers 651-1 to 651-M may multiplex corresponding signals according to the puncturing matrix before transmission, instead of enabling the first to $M^{th}$ puncturers 641-1 to 641-M to puncture corresponding symbols. In this case, the first to $M^{th}$ puncturers 641-1 to 641-M can be excluded.

As described above with reference to FIG. 6, the present invention periodically transmits a pilot sequence through one transmission antenna rather than through all transmission antennas of the transmitter, contributing to an increase in a data rate.

Figure 3:
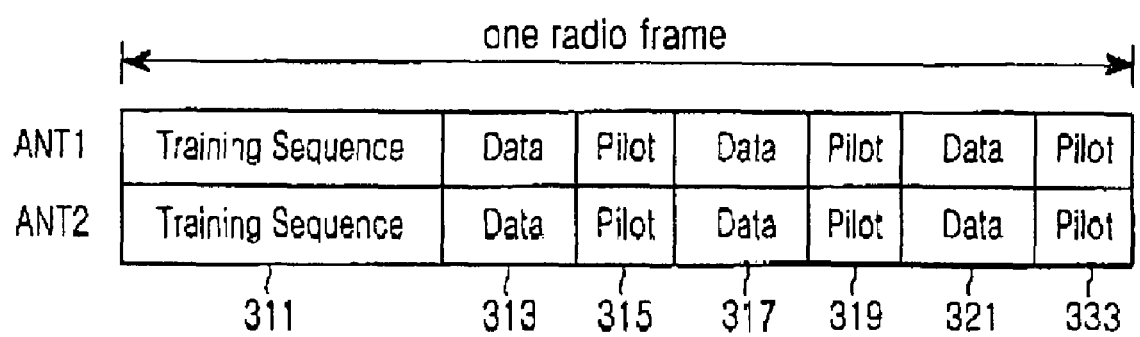
FIG. 3 schematically illustrates a frame format transmitted by the transmitter illustrated in FIG. 1.
Figure 4:
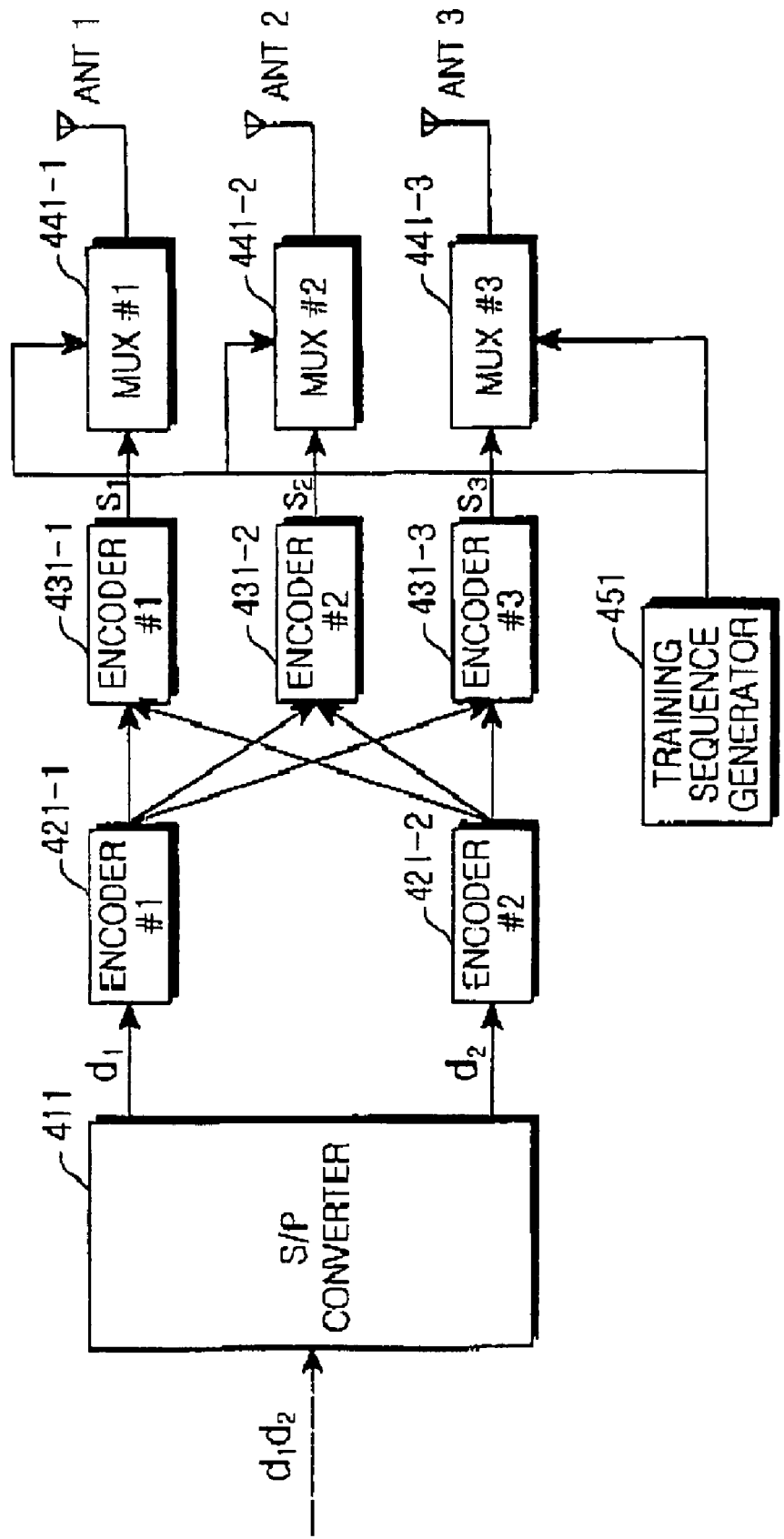
FIG. 4 is a block diagram schematically illustrating a structure of an STTC transmitter having two encoders and 3 transmission antennas.
Figure 5:
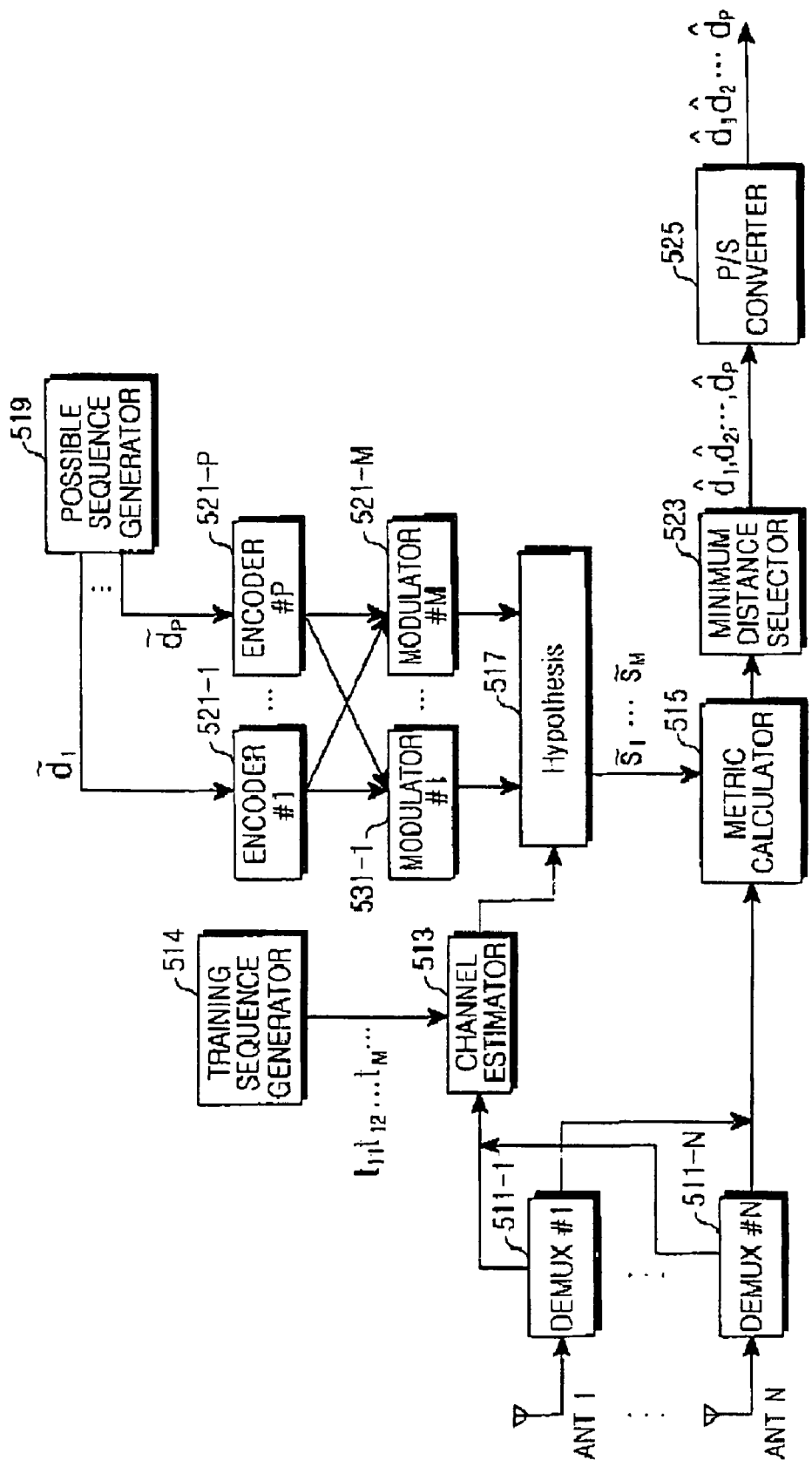
FIG. 5 is a block diagram schematically illustrating a receiver structure corresponding to the transmitter structure illustrated in FIG. 1.
Figure 7:
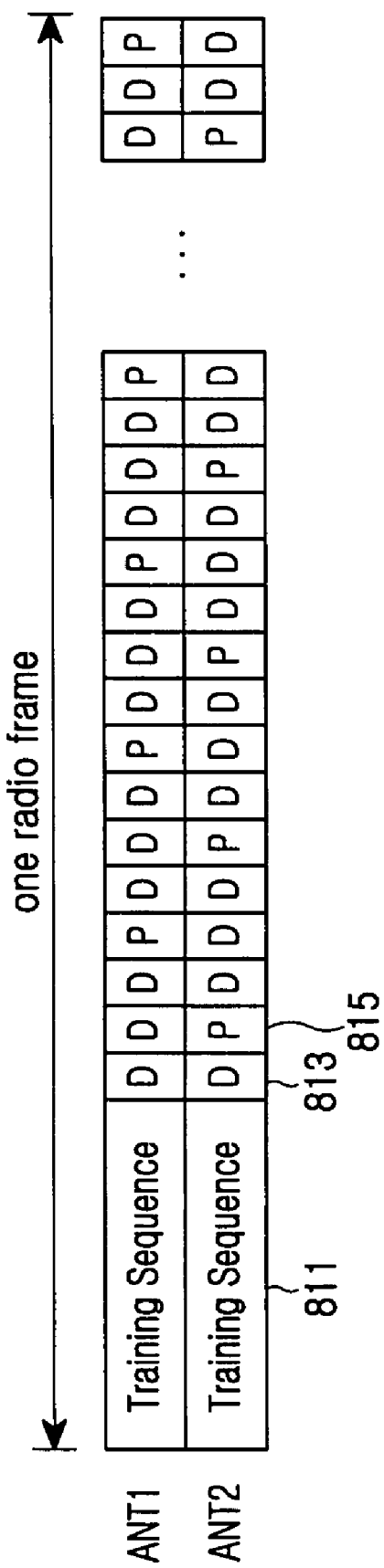
FIG. 7 schematically illustrates a frame format transmitted by the transmitter of FIG. 6.

FIG. 7 schematically illustrates a frame format transmitted by the transmitter illustrated in FIG. 6. FIG. 7 will be described on the assumption that the number of transmission antennas included in the transmitter illustrated in FIG. 6 is 2. Referring to FIG. 7, each of frame formats transmitted through a first transmission antenna ANT#1 and a second transmission antenna ANT#2 is comprised of a training sequence transmission period (Training_Sequence) 811, information data transmission periods (D) 813, and pilot sequence transmission periods (P) 815. The training sequence transmission period 811 is a time period in which a training sequence for initial channel estimation between the transmitter and a receiver is transmitted. The information data transmission periods 813 are time periods in which actual information data is transmitted, and the pilot sequence transmission periods 815 are time periods in which a pilot sequence for channel estimation during transmission/reception of actual information data is transmitted. Herein, the time period in which the training sequence is transmitted is defined as "$T_T$," the time period in which the information data is transmitted is defined as "$T_D$," and the time period in which the pilot sequence is transmitted is defined as "$T_P$." In the prior art, as was described in conjunction with FIG. 3, the transmitter (1) transmits only a training sequence for the time period $T_T$, (2) transmits information data for the time period $T_D$, and (3) transmits only a pilot sequence for the time period $T_P$. When a pilot sequence is transmitted in the conventional method, no information data can be transmitted for a transmission period of the pilot sequence, causing a decrease in a data rate. However, the present invention periodically punctures information data according to a puncturing matrix while transmitting the information data in accordance with the frame format as illustrated in FIG. 7, and inserts a pilot sequence in a portion where the information data is punctured, before transmission. Therefore, it is possible to transmit information data even while transmitting a pilot sequence, thereby contributing to an increase in a data rate.

Figure 8:
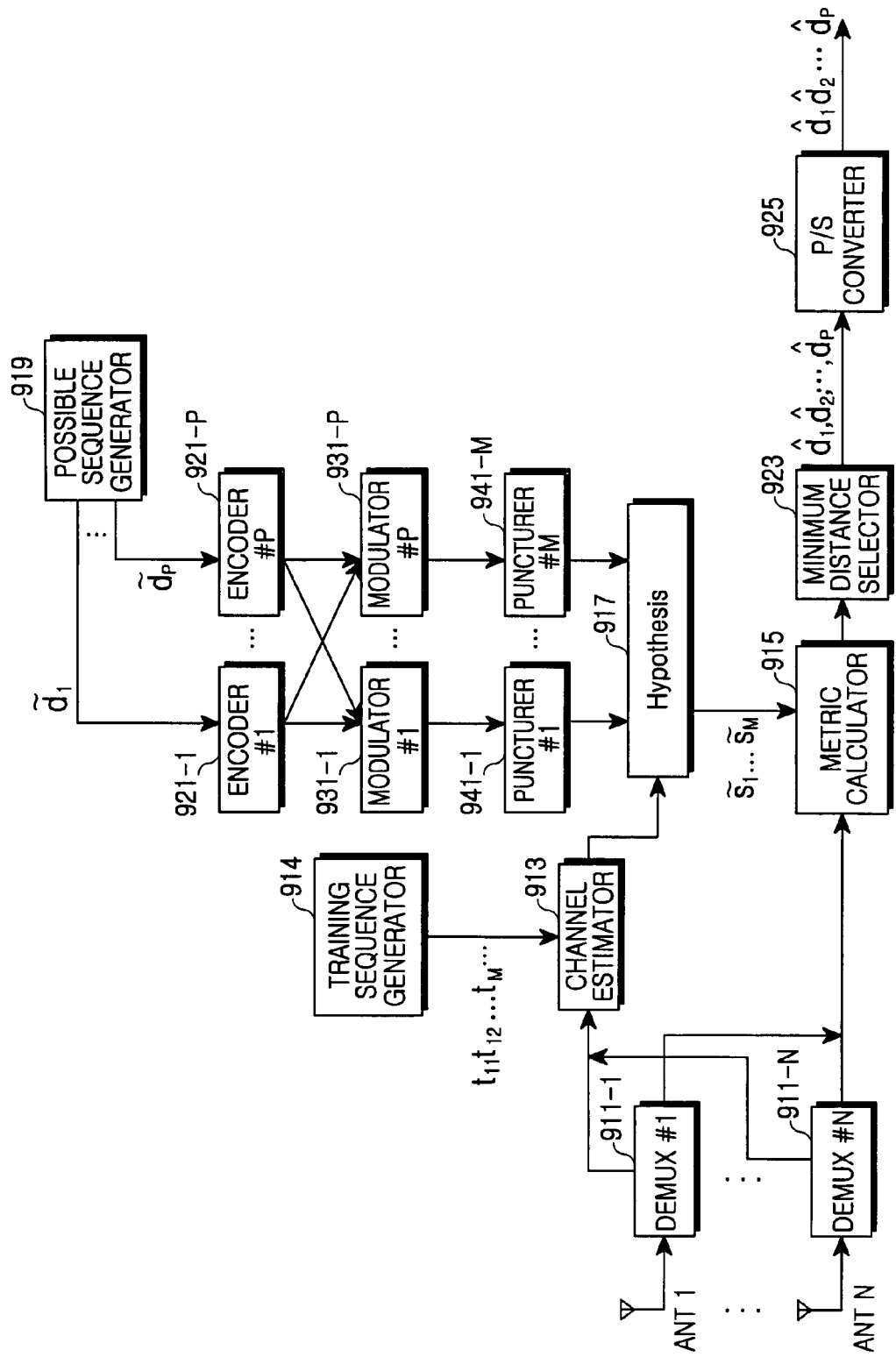
FIG. 8 is a block diagram schematically illustrating a receiver structure corresponding to the transmitter structure of FIG. 6.

FIG. 8 is a block diagram schematically illustrating a receiver structure corresponding to the transmitter structure illustrated in FIG. 6. Referring to FIG. 8, a signal transmitted to the air by a transmitter is received through reception antennas of the receiver. It is assumed in FIG. 8 that there are provided N reception antennas. The N reception antennas each process signals received from the air. Specifically, a signal received through a first reception antenna ANT#1 is provided to a first demultiplexer (DEMUX) 911-1, and in this manner, a signal received through an $N^{th}$ reception antenna ANT#N is provided to an $N^{th}$ demultiplexer 911-N. The first to $N^{th}$ demultiplexers 911-1 to 911-N demultiplex signals received from the first to $N^{th}$ reception antennas ANT#1 to ANT#N, and provide their outputs to a channel estimator 913 or a metric calculator 915. Here, the first to $N^{th}$ demultiplexers 911-1 to 911-N demultiplex their input signals into information data, a training sequence, or a pilot sequence. In other words, the first to $N^{th}$ demultiplexers 911-1 to 911-N demultiplex a received signal to be matched with a corresponding transmission period of the transmitter, as was described in conjunction with FIG. 7.

That is, if the received signal corresponds to a period for which a training sequence is received, the first to $N^{th}$ demultiplexers 911-1 to 911-N provide the received training sequence to the channel estimator 913. If the received signal corresponds to a period for which information data is received, the first to $N^{th}$ demultiplexers 911-1 to 911-N provide the received information data to the metric calculator 915. If the received signal corresponds to a period in which a pilot sequence is received, the first to $N^{th}$ demultiplexers 911-1 to 911-N provide the received pilot sequence to the channel estimator 913. In the present invention, because the transmitter transmitted the information data, training sequence or pilot sequence by applying a puncturing matrix, the first to $N^{th}$ demultiplexers 911-1 to 911-N demultiplex the receive signal into information data, a training sequence or a pilot sequence according to the puncturing matrix. That is, if an element of the puncturing matrix is "1," the first to $N^{th}$ demultiplexers 911-1 to 911-N provides the received signal to the metric calculator 915, and if an element of the puncturing matrix is "0," the first to $N^{th}$ demultiplexers 911-1 to 911-N provides the received signal to the channel estimator 913.

The channel estimator 913 channel-estimates signals output from the first to $N^{th}$ demultiplexers 911-1 to 911-N by using a signal output from a training sequence generator 914, and outputs the channel estimation result to a hypothesis part 917. Here, the training sequence generator 914 generates a training sequence or pilot sequence generated in the transmitter, i.e., the same training sequence or pilot sequence as the training sequence or pilot sequence generated by the training sequence generator 661 described in conjunction with FIG. 6. Therefore, the channel estimator 913 performs initial channel estimation by comparing output signals of the first to $N^{th}$ demultiplexers 911-1 to 911-N, received for a period where an element of the puncturing matrix is "1," with a signal output from the training sequence generator 914. A process of performing channel estimation by using the training sequence or pilot sequence is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, so a detailed description thereof will be omitted.

A possible sequence generator 919 generates all kinds of sequences which were possibly simultaneously encoded for information data bits transmitted by the transmitter, and provides the generated sequences to first to $P^{th}$ encoders 921-1 to 921-P. Because the transmitter transmits information data by the P information bits, the possible sequence generator 919 generates possible sequences $\tilde{d}_1 \ldots \tilde{d}_P$ comprised of P bits. The P bits of the generated possible sequences are applied to the first to $P^{th}$ encoders 921-1 to 921-P, and the first to $P^{th}$ encoders 921-1 to 921-P encode their input bits in the STTC encoding scheme as was described in conjunction with FIG. 2, and then provide the encoded bits to first to $M^{th}$ modulators 931-1 to 931-M. The first to $M^{th}$ modulators 931-1 to 931-M each modulate the encoded bits output from the first to $P^{th}$ encoders 921-1 to 921-P in a predetermined modulation scheme, and provide their outputs to first to $M^{th}$ puncturers 941-1 to 941-M. The modulation scheme applied in the first to $M^{th}$ modulators 931-1 to 931-M is set to any one of the BPSK, QPSK, QAM, PAM, and PSK modulation schemes. Because a modulation scheme applied in the first to $M^{th}$ modulators 631-1 to 631-M illustrated in FIG. 6 is $2^P$-ary QAM, the first to $M^{th}$ modulators 931-1 to 931-M also modulate their input signals in the $2^P$-ary QAM modulation scheme.

The first to $M^{th}$ modulators 931-1 to 931-M modulate signals output from the first to $P^{th}$ encoders 921-1 to 921-P in the $2^P$-ary QAM modulation scheme, and then provide their outputs to the first to $M^{th}$ puncturers 941-1 to 941-M. The first to $M^{th}$ puncturers 941-1 to 941-M puncture the modulation symbols output from the first to $M^{th}$ modulators 931-1 to 931-M according to a puncturing matrix identical to the puncturing matrix applied in the first to $M^{th}$ puncturers 641-1 to 641-M illustrated in FIG. 6, and then provide their outputs to the hypothesis part 917. The hypothesis part 917 receives signals output from the first to $M^{th}$ puncturers 941-1 to 941-M and the channel estimation result output from the channel estimator 913, generates a hypothetic channel output at a time when a sequence consisting of the signals output from the first to $M^{th}$ puncturers 941-1 to 941-M passed a channel corresponding to the channel estimation result, and provides the generated hypothetic channel output to the metric calculator 915. When the first to $M^{th}$ puncturers 941-1 to 941-M perform a puncturing operation according to the puncturing matrix, a signal output from one particular puncturer does not exist. However, in the present invention, since the first to $M^{th}$ puncturers 941-1 to 941-M perform a puncturing operation according to the puncturing matrix and a pilot sequence is inserted into the punctured period, an effect of inserting the pilot sequence must be considered.

The metric calculator 915 must calculate a metric after subtracting a value determined by multiplying the pilot sequence by a characteristic of a channel over which the pilot sequence was transmitted, from received signals, i.e., the signals output from the first to $N^{th}$ demultiplexers 911-1 to 911-N. Because the pilot sequence is previously known to both a transmission side and a reception side, there is no decrease in a decoding gain due to the pilot sequence during decoding. The metric calculator 915 receives the hypothetic channel output provided from the hypothesis part 917 and the signals output from the first to $N^{th}$ demultiplexers 911-1 to 911-N, and calculates a distance between the hypothetic channel output and the output signals of the first to $N^{th}$ demultiplexers 911-1 to 911-N. The metric calculator 915 uses Euclidean distance when calculating the distance.

In this manner, the metric calculator 915 calculates Euclidean distance for all possible sequences the transmitter can transmit, and then provides the calculated Euclidean distance to a minimum distance selector 923. The minimum distance selector 923 selects a Euclidean distance having the minimum distance from Euclidean distances output from the metric calculator 915, determines information bits corresponding to the selected Euclidean distance as information bits transmitted by the transmitter, and provides the determined information bits to a parallel-to-serial (P/S) converter 925. Although there are several possible algorithms used when the minimum distance selector 923 determines information bits corresponding to the Euclidean distance having the minimum distance, it is assumed herein that a Viterbi algorithm is used. A process of extracting information bits having the minimum distance by using the Viterbi algorithm is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, so a detailed description thereof will not be provided for simplicity.

Because the minimum distance selector 923 determines information bits corresponding to the Euclidean distance having the minimum distance for all sequences generated from the possible sequence generator 919, it finally outputs P information bits of $\hat{d}_1, \hat{d}_1, \ldots, \hat{d}_P$. The P/S converter 925 then serial-converts the P information bits output from the minimum distance selector 923, and outputs reception information data sequences $\hat{d}_1, \hat{d}_1, \ldots, \hat{d}_P$.

An operation of the present invention will now be described with reference to the transmitter structure and the receiver structure described above.

First, it will be assumed that the transmitter has 2 transmission antennas and the receiver has 1 reception antenna. A signal transmitted over the air by the transmitter is received at the receiver as a signal given by $$r_i = h_1 s_{1,i} + h_2 s_{2,i} + n_i \qquad \text{Equation (3)}$$

In Equation (3), $r_i$ denotes a signal received at an $i^{th}$ point of time, $s_{j,i}$ denotes a signal transmitted through a $j^{th}$ transmission antenna at an $i^{th}$ point of time, $n_i$ denotes a noise component at an $i^{th}$ point of time, and $h_j$ denotes a channel characteristic that a transmission signal experiences through a $j^{th}$ transmission antenna.

For example, if it is assumed that the transmitter uses BPSK as its modulation scheme and a constraint length for STTC encoding is K (constraint length=K), then signals $s_{1,i}$ and $S_{2,i}$ received at a receiver corresponding to the transmitter are represented as a linear combination of information data bits $d_{t-K}, \ldots, d_t$. Thus, the receiver generates all possible values of the received signals $s_{1,i}$ and $S_{2,i}$ by considering all possible combinations of the information data bits $d_{t-K}, \ldots, d_t$. These values are generated by the possible sequence generator 919 as was described in conjunction with FIG. 8. In addition, a hypothetic reception signal must be generated using the channel characteristics $h_1$ and $h_2$, and a value determined by subtracting the hypothetic reception signal from an actually received signal is calculated as a metric. In order to calculate the metric in this way, the channel characteristics $h_1$ and $h_2$ must be determined. For that purpose, a transmitter transmits a training sequence so that a receiver can detect the channel characteristics $h_1$ and $h_2$.

Generally, the training sequence is inserted in a front most part of a frame before being transmitted, thereby enabling initial channel estimation between the transmitter and the receiver. However, when a channel environment undergoes a frequent change to the extent that a channel characteristic is changed within one frame, a frame error rate (FER) is increased. Therefore, the transmitter inserts a pilot sequence in the frame before transmission to decrease the frame error rate. However, when the pilot sequence is transmitted, no information data is transmitted, thereby decreasing a data rate.

For example, as described in the prior art section, if there are a total of L pilot sequence transmission periods or information data transmission periods for one frame, the entire overhead becomes $(LT_P + T_T)/(LT_P + LT_D + T_T)$. For example, assuming a period $T_D$ for which the information data is transmitted has a length 3 times longer than a period $T_P$ for which the pilot sequence is transmitted, if the L is set to a relatively large value, an overhead of the transmitter is 25% of the entire overhead. Disadvantageously, a decrease in a data rate of the transmitter causes a reduction in the system performance. However, the present invention periodically punctures a transmission period of information data and transmits a pilot sequence for the punctured transmission period, instead of separately defining a transmission period of a pilot sequence. As a result, the present invention can transmit a pilot sequence without a decrease in a data rate, thereby maintaining a data rate of the system. That is, the existing transmitter using STTC can transmit information data of $LT_D$ bits for one frame, whereas the present invention can transmit information data of $LT_P + DT_D$ bits for one frame. In addition, it is possible to maintain a diversity gain by periodically setting a data transmission period which undergoes puncturing to insert the pilot sequence, for the individual antenna.

Figure 9:
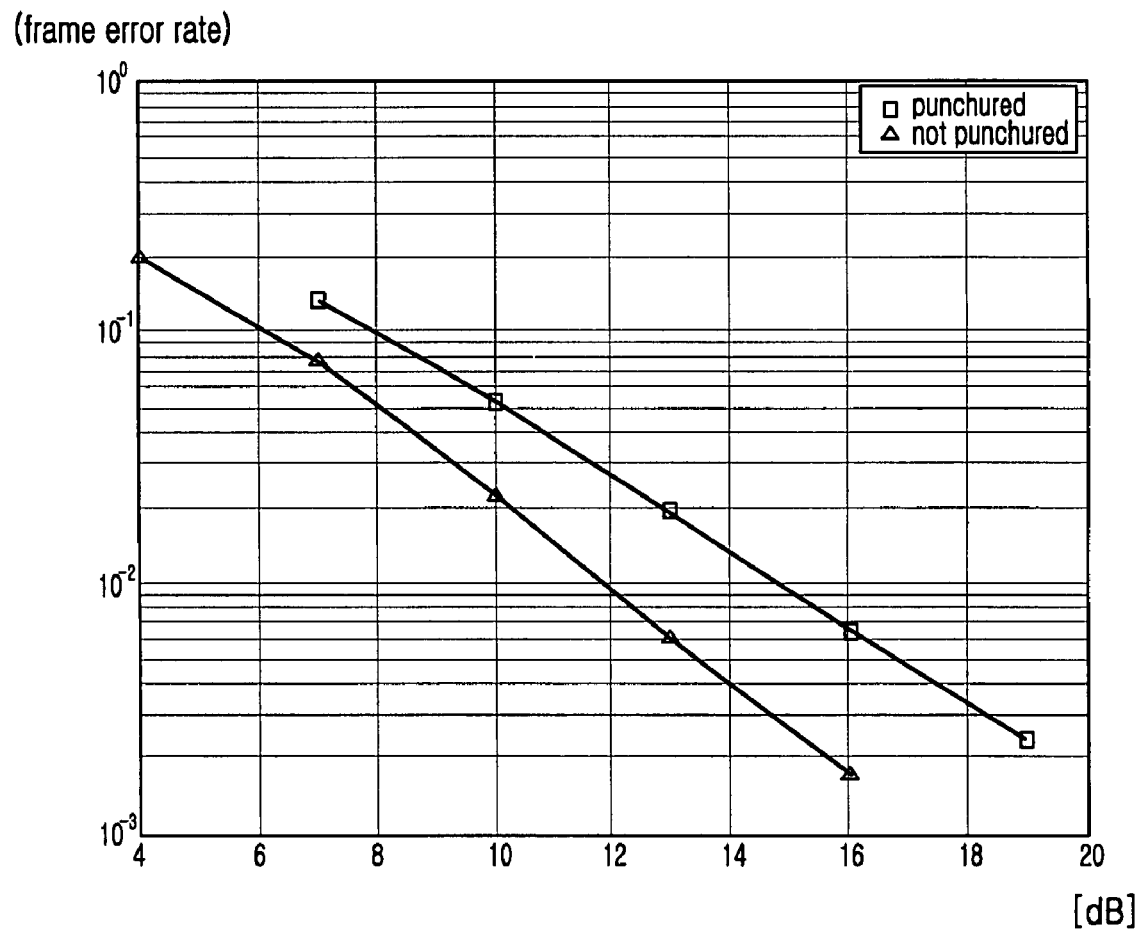
FIG. 9 is a graph illustrating a simulation result of the present invention.

FIG. 9 is a graph schematically illustrating a simulation result of the present invention. It is assumed in FIG. 9 that the number of transmission antennas included in a transmitter is 2, a constraint length K applied for STTC encoding is 5 (K=5), BPSK is applied as a modulation scheme, one frame consists of 20 symbols and has 15 information data symbol periods and 5 pilot sequence symbol periods, and the number of reception antennas included in a receiver is 1. In addition, it is assumed that signals transmitted through the 2 transmission antennas undergo independent Rayleigh fading channels, and channel estimation performance is 100%.

As illustrated in FIG. 9, for a frame error rate 0.1, the present invention shows performance degradation of about 2 dB as compared with a general STTC transmitter which transmits no information data during transmission of a pilot sequence. The present invention, although it suffers from slight performance degradation in terms of a frame error rate, contributes to performance improvement in terms of a data rate. That is, in the general STTC transmitter, all transmission antennas cannot transmit information data during transmission of a pilot sequence, so a receiver receives 15 information data symbols for one frame. However, the STTC transmitter according to the present invention can transmit information data even during transmission of a pilot sequence, so a receiver can receive 20 information data symbols for one frame. Comparing the transmitters, the proposed STTC transmitter has a data rate 4/3 times higher than a data rate of the existing STTC transmitter.

In a mobile communication system using STTC, the present invention periodically punctures information data symbols for individual transmission antennas and transmits a pilot sequence for a transmission period of the punctured data symbols, thereby preventing a data loss due to transmission of the pilot sequence. Therefore, in the mobile communication system using STTC, information data is transmitted even during transmission of a pilot sequence, thereby increasing a data rate and improving system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for receiving a sequence for channel estimation in a mobile communication system which receives through N reception antennas symbol streams transmitted by a transmitter through M transmission antennas, the apparatus comprising:

N demultiplexers individually connected to the N reception antennas, for outputting at least one reception symbol of at least one predetermined position among the received symbol streams, as the sequence for the channel estimation, for each reception symbol stream output from the N reception antennas; and a channel estimator for performing channel estimation by using the sequences for the channel estimation, output from the N demultiplexers, wherein the symbol streams are generated by puncturing at least one modulation symbol of at least one predetermined position among modulation symbol streams to be transmitted the transmission antennas and multiplexing the punctured symbol streams and the sequence to be inserted into the predetermined position of the punctured symbol streams.

2. The apparatus of claim 1, wherein the N demultiplexers each have same numbers of symbols output as the sequence, for the received symbol streams.

3. The apparatus of claim 1, wherein the at least one predetermined position of symbols output as the sequence is periodically repeated for the reception symbol streams.

4. The apparatus of claim 1, wherein the sequence is a pilot sequence.

5. A method for receiving a sequence for channel estimation in a mobile communication system which receives through N reception antennas symbol streams transmitted by a transmitter through M transmission antennas, the method comprising the steps of:

outputting at least one reception symbol of at least one predetermined position among the received symbol streams, as sequence for the channel estimation, for each reception symbol stream output from the N reception antennas; and performing channel estimation by using the sequences for the channel estimation, wherein the symbol streams are generated by puncturing at least one modulation symbol of at least one predetermined position among modulation symbol streams to be transmitted transmission antennas and multiplexing the punctured symbol streams and the sequence to be inserted into the predetermined position of the punctured symbol streams.

6. The method of claim 5, wherein the received symbol streams have same numbers of symbols output as the sequence.

7. The method of claim 5, wherein the at least one predetermined position of symbols output as the sequence is periodically repeated for the reception symbol streams.

8. The method of claim 5, wherein the sequence is a pilot sequence.

* * * * *